Nov. 24, 1925.
N. T. K. MOLLBERG
1,562,463
LENS APPARATUS
Filed June 29, 1921
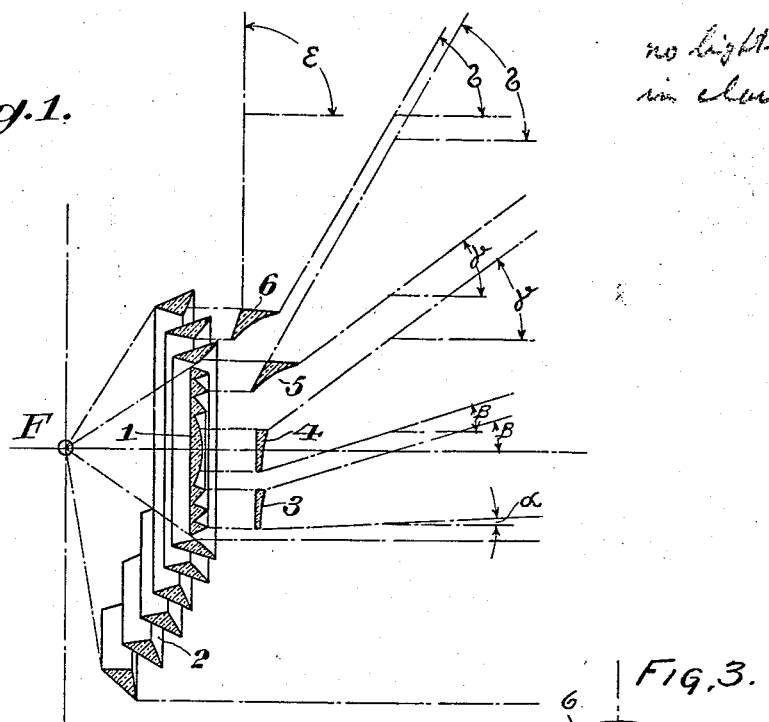
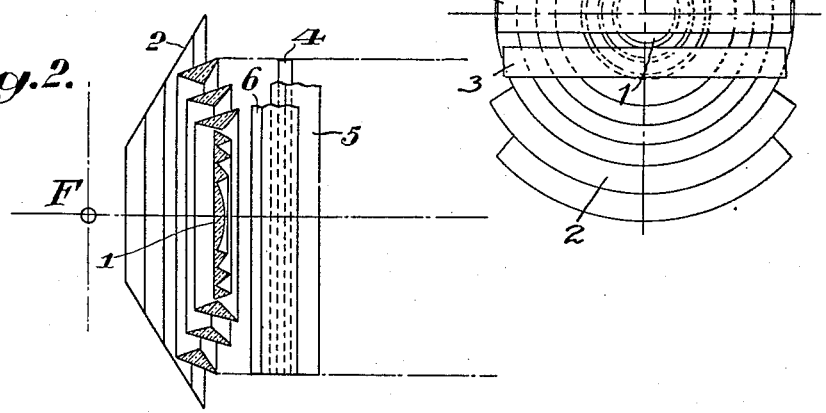
INVENTOR.
Nils Thure Kristian Mollberg
BY Cyrus N. Anderson
ATTORNEY.

Patented Nov. 24, 1925.

1,562,463

UNITED STATES PATENT OFFICE.

NILS THURE KRISTIAN MOLLBERG, OF SKARSATRA, LIDINGON, SWEDEN, ASSIGNOR TO AMERICAN GASACCUMULATOR COMPANY, OF ELIZABETH, NEW JERSEY, A CORPORATION OF NEW JERSEY.

LENS APPARATUS.

Application filed June 29, 1921. Serial No. 481,392.

*To all whom it may concern:*

Be it known that I, NILS THURE KRISTIAN MOLLBERG, a subject of the King of Sweden, residing at Skarsatra, Lidingon, Sweden, have invented certain new and useful Improvements in Lens Apparatus, of which the following is a specification.

The present apparatus refers to an improvement in lens apparatus, especially lens apparatus employed or adapted for aeronautic purposes. In such lens apparatus it is necessary to spread the light bundles from the horizon to the zenith. According to the invention an arrangement, performing such a dispersion is obtained, occupying a small space in radial direction, and having high efficiency in dispersing the light bundles.

Fig. 1 is a vertical sectional view of lens apparatus embodying my invention, showing a lens panel and a system of prisms arranged in front of said panel in accordance with the invention;

Fig. 2 is a view partly in horizontal section and partly in plan view of the said apparatus;

Fig. 3 is a view in front elevation; that is, looking toward the left in Figs. 1 and 2.

Referring to the drawing: The focus of the lens panel comprising the lens 1 and the prisms 2 is indicated at F.

It is a known fact that the light rays radiating from the lens panel are spread in both vertical and horizontal directions due to the fact that the light source is not a point but has a certain extension or dimension. In order to augment the vertical dispersion of the light rays so that they may radiate from a horizontal plane up to zenith or in any other suitable direction without affecting the horizontal dispersion thereof, a number of prisms, 3, 4, 5 and 6, are employed in accordance with my invention, which prisms are so constructed and arranged in front of the lens panel that each of them effects or causes a part of the vertical dispersion; that is to say, each of the said prisms effects dispersion of a certain group of rays transmitted through or by the lens and portions of certain of the prisms of the lens panel.

According to the construction illustrated the prisms 3 and 4 spread the rays in angles $\alpha$—$\beta$—$\gamma$, close to the horizon, said prisms being dioptrical, whereas the prisms 5 and 6, dispersing the rays in angles $\gamma$—$\delta$—$\varepsilon$ are catadioptrical. The number of prisms employed in front of the lens panel may be increased or diminished, within limits, as may be desired and may be also arranged so as to effect dispersion in a different manner and in a different direction from that shown. It is essential, however, that they spread the rays radiating from the lens apparaus from horizon to zenith.

When a head light lens is employed it may be rotating and consisting of several fields.

Lens apparatus of other kinds, radiating rays in horizontal direction, may also be employed.

Having now described my invention and set forth the manner, in which the same is to be performed, what I claim is:

1. In lens apparatus, the combination of the lens, and a set of prisms, in front of the lens, so constructed and placed as to provide a plurality of groups of light rays, radiaing from the lens, the rays of the different groups extending at different angles with respect to the horizon, some of the rays of the uppermost group extending toward the zenith.

2. In lens apparatus, the combination of the lens, and a set of prisms in front of the lens, so constructed and placed as to divide the rays which radiate from the said lens into a plurality of groups of rays which groups extend in succession from the horizon to the zenith, the angles of the rays of each group with respect to the horizon being different from the angles of the rays of each of the other groups with respect to such horizon.

3. In lens apparatus of the character described, the combination of a lens panel and a set of prisms in front of the said lens panel, the said prisms being arranged in spaced parallel relation with respect to each other and operating to provide a plurality of groups of rays transmitted through the lens of said lens panel which extend upwardly at different angles to the horizon, the lower of said prisms being dioptrical while the others are catadioptrical.

4. In lens apparatus of the character described, the combination of a lens panel comprising a lens and prisms concentric therewith, and a plurality of prisms situated in front of said lens panel which prisms are arranged in spaced parallel relation with respect to each other and certain of which are dioptrical while the others are catadioptrical, the said dioptrical and catadioptrical prisms dividing the rays which are transmitted through the lens panel into a plurality of independent and separate groups of rays which extend upwardly at varying angles with respect to the horizon, the said groups extending from the horizon to the zenith.

5. In lens apparatus of the character described, the combination of a lens panel with means situated in front of said panel which divides the rays of light which radiate from said lens panel into a plurality of groups of rays which extend upwardly and at different angles with respect to the horizon, the lowest one of said groups extending in a direction only slightly above that of the plane of the horizon while portions of the rays of the uppermost of said groups extend toward the zenith.

In testimony whereof I have signed my name to this specification.

NILS THURE KRISTIAN MOLLBERG.